United States Patent [19]
Turcotte et al.

[11] Patent Number: 6,137,772
[45] Date of Patent: Oct. 24, 2000

[54] METHOD OF UPDATING A LIST OF DIGITAL CONTROL CHANNELS (DCCH) IN A MOBILE STATION IN A RADIO TELECOMMUNICATIONS NETWORK

[75] Inventors: Eric Turcotte, Verdun; Angelo Cuffaro, Pierrefonds, both of Canada

[73] Assignee: Telefonaktiebolaget LM Ericsson (publ), Stockholm, Sweden

[21] Appl. No.: 08/969,887

[22] Filed: Nov. 14, 1997

[51] Int. Cl.[7] .................................................. H04Q 7/00
[52] U.S. Cl. ........................... 370/29; 370/343; 370/491
[58] Field of Search .................................. 370/329, 343, 370/344, 480–497

[56] References Cited

U.S. PATENT DOCUMENTS

| | | | |
|---|---|---|---|
| 5,353,332 | 10/1994 | Raith et al. | 379/59 |
| 5,404,355 | 4/1995 | Raith | 370/95.1 |
| 5,539,748 | 7/1996 | Raith | 370/95.1 |
| 5,570,467 | 10/1996 | Sawyer | 455/33.1 |
| 5,633,874 | 5/1997 | Diachina et al. | 370/329 |
| 5,722,078 | 2/1998 | Przelomiec et al. | 455/452 |
| 5,923,649 | 7/1999 | Raith | 370/328 |
| 6,016,428 | 1/2000 | Diachina et al. | 455/435 |

FOREIGN PATENT DOCUMENTS

| | | |
|---|---|---|
| WO 95/12936 | 5/1995 | WIPO . |
| WO 97/36449 | 10/1997 | WIPO ................................... 370/95.1 |

*Primary Examiner*—Huy D. Vu
*Assistant Examiner*—Dung Trinh
*Attorney, Agent, or Firm*—Smith & Danamraj, P.C.

[57] ABSTRACT

A method of providing a list of digital control channel (DCCH) frequencies that are in use in a radio telecommunications network to a mobile station operating in the network. Each DCCH includes a superframe having an extended broadcast control channel (E-BCCH) time slot which is broadcast in an E-BCCH cycle. The method begins by dividing the list of DCCH frequencies into a plurality of DCCH subsets, and sequentially or randomly broadcasting the DCCH subsets to the mobile station in the E-BCCH time slot of the DCCH. The next DCCH subset is broadcast when the current E-BCCH cycle is completed. Alternatively, the next DCCH subset may be broadcast when a timer expires. In this case, a broadcast control channel (BCCH) change notification (BCN) indicator is changed whenever a new subset is broadcast. A DCCH Frequency Plan message is added to IS-136, and includes a DCCH subset, an associated DCCH Frequency List Subset Sequence Identifier (SSI), and information elements to identify the System Operator Code (SOC) and System Identifier (SID).

21 Claims, 4 Drawing Sheets

METHOD OF UPDATING A LIST OF DIGITAL CONTROL CHANNELS (DCCH) IN A MOBILE STATION IN A RADIO TELECOMMUNICATIONS NETWORK

BACKGROUND OF THE INVENTION

1. Technical Field of the Invention

This invention relates to radio telecommunication systems and, more particularly, to a method of updating a list of digital control channels (DCCHs) in a mobile station, thereby enabling the rapid acquisition of a digital control channel.

2. Description of Related Art

Existing digital radio telecommunications networks operating under standards such as IS-136 utilize a digital control channel (DCCH) to pass control information to and from mobile stations operating within the service areas of the networks. A DCCH may be deployed in a cell on any frequency in the cellular or Personal Communication Services (PCS) frequency bands. Current techniques for acquiring a DCCH are based on proprietary mobile station techniques utilizing certain tools provided by IS-136. However, because of the wide range of frequency options, it is often difficult for a mobile station to rapidly acquire an available DCCH.

Analog control channels (ACCs) are easier to locate because they are located on a few consecutive dedicated frequencies. In addition, under IS-136, the ACCs broadcast a DCCH pointer. Therefore, one of the more commonly utilized techniques to locate an available DCCH is to first find an ACC, and then look for the broadcast DCCH pointer. This technique, however, is useless for 1900-MHz PCS frequency band operation since there is no ACC in the PCS frequency band. Furthermore, many mobile stations are digital-capable only, and this technique is useless for those mobile stations because they do not have the capability to decode and read an ACC. In addition, some 800-MHz cellular networks are digital only. Therefore, the technique of finding an ACC and utilizing the DCCH pointer does not work in these networks either.

Another technique for acquiring a DCCH is for the mobile station to scan a history list of DCCHs. This list is usually short, and therefore, does not normally take excessive time to scan. This technique may be ineffective, however, if the serving DCCH is not in the mobile station's history list. This may occur if the mobile station is powered up in a cell in which it has not operated before, or if the mobile station has operated there before, but the serving DCCH is no longer on the list due to the limited size of the list and the number of DCCHs subsequently utilized. In addition, a cell's DCCH frequency plan may be modified by an operator or by closed-loop adaptive channel allocation (ACA). In this case, the DCCH history list built up prior to the DCCH frequency plan modification becomes obsolete.

Although there are no known prior art teachings of a solution to the aforementioned deficiency and shortcoming such as that disclosed herein, U.S. Pat. No. 5,404,355 to Raith (Raith) and PCT Patent Application WO95/12936 to Henry et al. (Henry) discuss subject matter that bears some relation to matters discussed herein. Raith discloses a method of transmitting information on a DCCH between a base station and a mobile station in a cellular telecommunication system. The information is sent as a plurality of information elements, and a change flag is transmitted to indicate whether the value of any of the information elements has changed. Raith, however, does not teach or suggest a method of rapidly acquiring a DCCH in a cellular/PCS system.

Henry discloses a method and system for locating control channels, particularly digital control channels. The channels which are likely to be assigned as a DCCH are grouped, and a mobile station searching for a control channel begins its search with this group. Other channels currently serving as digital traffic channels (DTCs) contain a field in which a pointer redirects a searching mobile station to the DCCH. In addition, information describing the location of a control channel is also placed in call release messages so that the mobile station does not have to relocate a new control channel following handoff to a new base station. However, the system and method of Henry have disadvantages when a mobile station operates in a cellular/PCS network because of the wide range of frequency options. Since a DCCH may be deployed in a cell on any frequency in the cellular or PCS frequency bands, it is often difficult for a mobile station to rapidly acquire an available DCCH.

Review of each of the foregoing references reveals no disclosure or suggestion of a system or method such as that described and claimed herein.

In order to overcome the disadvantage of existing solutions, it would be advantageous to have a method of updating a list of DCCHs in a mobile station thereby enabling the rapid acquisition of a DCCH in a cellular/PCS system in which the DCCH may be deployed on any frequency in the cellular or PCS frequency bands. The present invention provides such a method.

SUMMARY OF THE INVENTION

In one aspect, the present invention is a method of providing a list of digital control channel (DCCH) frequencies that are in use in a radio telecommunications network to a mobile station operating in the network. The method begins by dividing the list of DCCH frequencies into a plurality of DCCH subsets, and sequentially broadcasting the DCCH subsets to the mobile station. This is followed by updating the DCCH frequencies in at least one of the subsets, and sequentially broadcasting the updated DCCH subsets to the mobile station.

In another aspect, the present invention is a method of providing a list of digital control channel (DCCH) frequencies that are in use in a radio telecommunications network to a mobile station operating in the network, wherein each DCCH includes a superframe having an extended broadcast control channel (E-BCCH). The set of messages broadcast on the E-BCCH typically span several superframes, referred to as an E-BCCH cycle. The method begins by dividing the list of DCCH frequencies into a plurality of DCCH subsets, broadcasting the DCCH subsets one at a time on the E-BCCH, and broadcasting the next DCCH subset when the current E-BCCH cycle is completed. This is followed by updating the DCCH frequencies in at least one of the subsets, broadcasting the updated DCCH subsets one at a time in the current E-BCCH cycle, and broadcasting the next updated DCCH subset when the current E-BCCH cycle is completed.

In yet another aspect, the present invention is a method of updating a digital control channel (DCCH) list in a mobile station in a radio telecommunications network having a DCCH Frequency Plan which includes a plurality of DCCH frequencies, and the mobile station stores a list of known DCCH frequencies in DCCH subsets. The method begins by dividing the plurality of DCCH frequencies in the DCCH Frequency Plan into a plurality of DCCH subsets and broadcasting from the network a DCCH Frequency Plan message which includes one of the DCCH subsets and an associated DCCH Frequency List Subset Sequence Identifier (SSI). This is followed by receiving the message in the mobile station, and determining in the mobile station whether the SSI received in the message corresponds to an SSI stored in the mobile station's DCCH list. If the received SSI does not correspond to a stored SSI, the received DCCH subset and the associated SSI are added to the mobile station's DCCH list. If it is determined that the received SSI corresponds to a stored SSI, the method then replaces the stored DCCH subset with the received DCCH subset.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

In the method of the present invention, a DCCH Frequency Plan message (which is a new message according to the teachings of the present invention), is broadcast containing a subset of the frequencies associated with the network's DCCH frequency plan. At a subsequent time, a new subset is broadcast. This process is repeated until all the frequencies of the DCCH frequency plan have been broadcast. Normally, an operator deploying DCCHs will utilize less than 43 frequencies (according to the 7/42 reuse plan) in a given cellular or PCS market for DCCHs. Then, the process starts over again. By dividing the DCCH frequencies into subsets, less bandwidth is required for the broadcast. In the exemplary embodiment described herein, the size of the DCCH frequency plan subset is kept relatively small (for example, less than 9 frequencies) compared to the total number of frequencies used for the DCCH frequency plan. Subsets smaller than nine frequencies will generally provide at least five (5) subsets. Although this size of subset is preferred, other sizes may obviously be utilized within the scope of the present invention. The tradeoff is that although smaller subsets require less average bandwidth to broadcast, they result in a larger number of subsets and, therefore, require a longer time period for the entire frequency plan to be broadcast (given an equal time period between subsets).

The mobile station then reads this DCCH information, and builds up a list of DCCHs that are associated with a particular network. The list is then utilized by the mobile station for subsequent cell selection.

Figure 1:
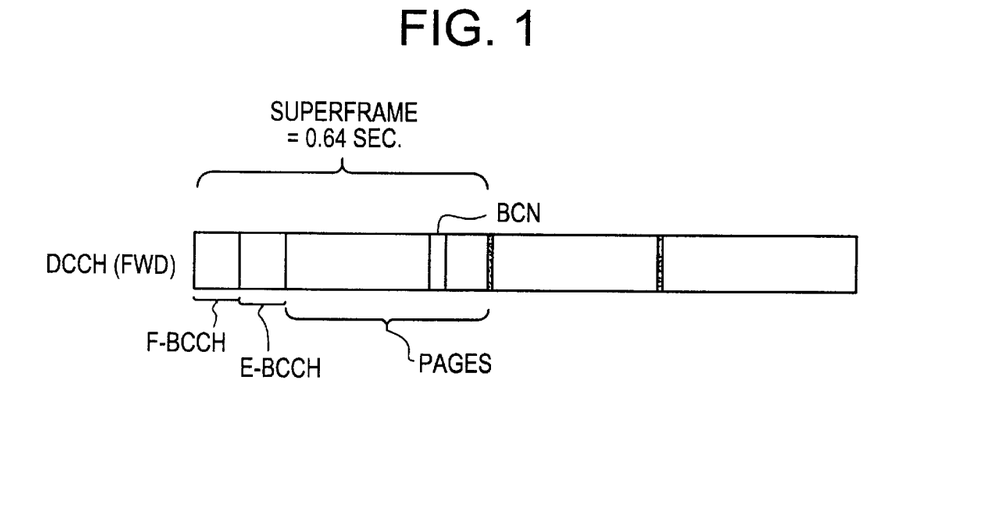
FIG. 1 (Prior Art) shows the format of a superframe which is broadcast on the digital control channel (DCCH) according to a known industry standard.

FIG. 1 shows the format of a superframe which is broadcast on the DCCH according to a known industry standard. The DCCH superframe is 0.64 seconds in duration.

In the current version of IS-136, at least two types of logical DCCH broadcast control channels (BCCH) are utilized within the superframe to send communications to specific mobile stations: a Fast BCCH (F-BCCH) and an Extended BCCH (E-BCCH). There is also another logical channel for sending pages. The broadcast control channel is utilized to send overhead messages to mobile stations with system identity and other system parameters known in the art and specified in IS-1 36, which is hereby incorporated by reference herein.

The DCCH Frequency Plan list of the present invention may be broadcast on either BCCH logical channel, however, it is preferred to utilize the E-BCCH. The reason for using the E-BCCH is that it is not necessary to increase its associated bandwidth to transmit more information. Messages sent in the F-BCCH must be short enough to fit within a single DCCH superframe. Thus, these messages are acquired by the mobile stations very quickly. The E-BCCH can be utilized to send less time-critical system information. If the messages are too long to fit within the E-BCCH time slots in a superframe, they can be continued and completed in subsequent E-BCCH time slots in subsequent superframes. However, since the message information is spread out over several E-BCCH time slots in different superframes, it takes longer for the mobile station to acquire the information.

Figure 2:
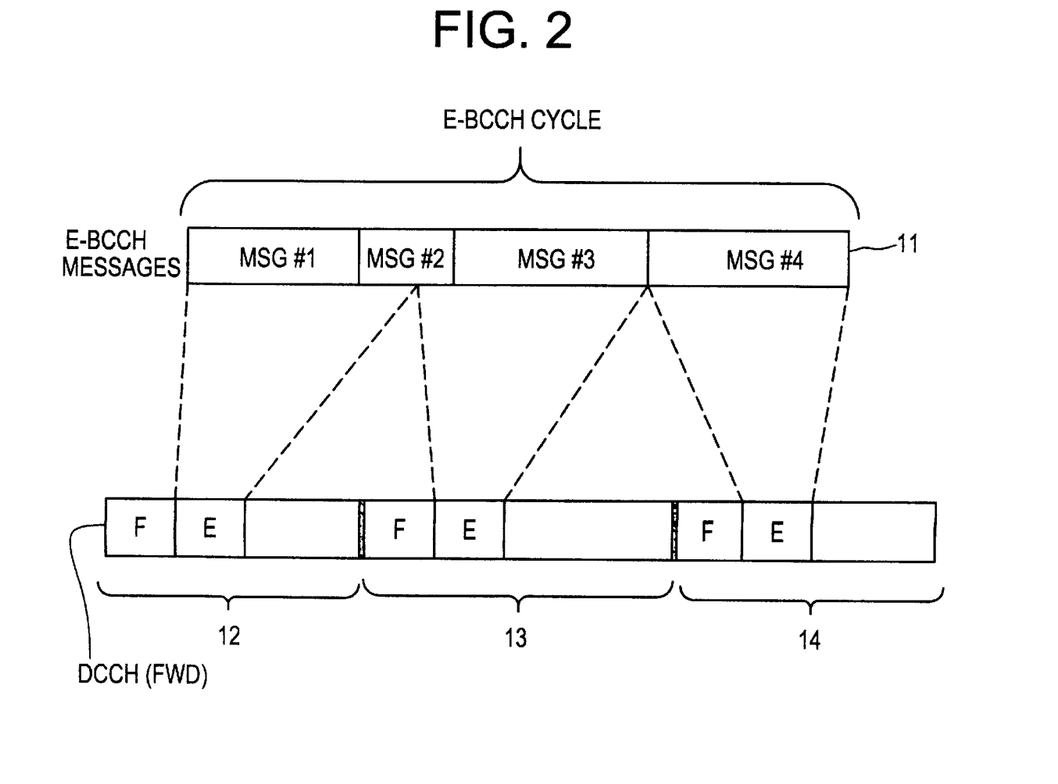
FIG. 2 shows an Extended BCCH (E-BCCH) cycle transmitted over a pluralityof DCCH superframes.

FIG. 2 shows an Extended BCCH (E-BCCH) cycle transmitted over a pluralityof DCCH superframes. A set of messages 11 are broadcast during the E-BCCH cycle, but there is not enough bandwidth to broadcast the entire message set in one superframe 12. Therefore, the messages 11 are continued in subsequent superframes 13 and 14. It should be noted that the illustration of three superframes is exemplary only, and a greater or lesser number of superframes may be utilized to broadcast the entire message set.

The mobile station does not continuously read the BCCH information on the DCCH. Upon entering a cell, the mobile station acquires both the F-BCCH and E-BCCH information on a new DCCH. The mobile station then monitors a BCCH Change Notification (BCN) indicator on its paging subchannel. If the information broadcast on the F-BCCH or E-BCCH is modified, and it is a change that all mobile stations listening to the current DCCH should have, the BCN indicator bit is toggled in all the DCCH-associated paging subchannels. The mobile stations in that cell, upon detecting a BCN transition, then read the BCCH and update the associated information.

Two methods can be utilized for the acquisition of the DCCH frequency plan by a mobile station in the method of the present invention. One method is random and relies on the mobile station moving from cell to cell (the mobile station reads the BCCH information when changing cells). The other method tells the mobile station to read the information. In the first method, the network may periodically update the DCCH frequency plan subset without changing the BCN indicator, and in the second method, the network may periodically update the DCCH frequency plan subset coincidentally with changing the BCN indictor. If the subset is updated without changing the BCN indicator, the DCCH list subset is changed from one E-BCCH cycle to another. A mobile station according to the present invention acquires the E-BCCH cycle information as often as it is currently required in IS-136. The mobile station reads the DCCH Frequency Plan message, and updates the corresponding entries in its list. The DCCH Frequency Plan message contains only a subset of the DCCH frequency plan. Each time the mobile station reads an E-BCCH cycle in any cells of the network broadcasting the DCCH Frequency Plan message, the mobile station acquires a new DCCH frequency subset. After a certain number of E-BCCH cycles have been read in any cells of the network, the complete list of DCCH frequencies is acquired/updated in the mobile station.

Figure 3:
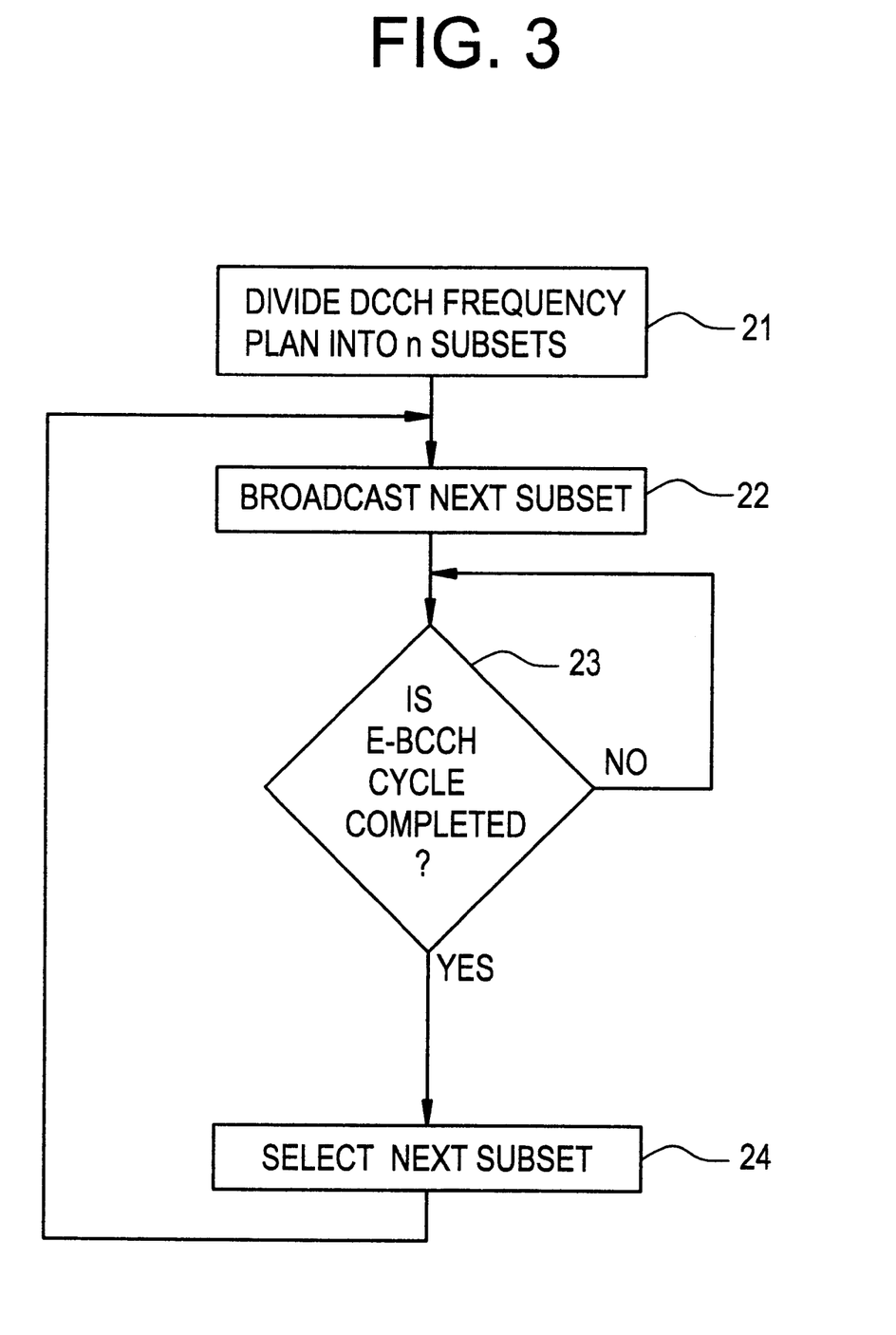
FIG. 3 is a flow chart of the steps involved in the method of the present invention when the cellular network updates the DCCH Frequency Plan subset without changing the BCCH Change Notification (BCN) indicator.

FIG. 3 is a flow chart of the steps involved in the method of the present invention when the DCCH Frequency Plan subset is updated without changing the BCCH Change Notification (BCN) indicator. At step 21, the DCCH Frequency Plan is divided into a plurality of subsets such that the number of frequencies in each subset is small compared to the overall DCCH Frequency Plan. For example, each DCCH subset may have less than nine frequencies. At step 22, the cellular network broadcasts the first randomly selected (or next) subset. In this method, each DCCH subset is broadcast in one complete E-BCCH cycle. Thus, at step 23, it is determined whether or not the current E-BCCH cycle is completed. If not, the method remains at step 23 and waits for the cycle to complete. If, however, it is determined at step 23 that the E-BCCH cycle is completed, the method moves to step 24 where the cellular network randomly or sequentially selects the next DCCH subset. The method then returns to step 22 and repeats the process.

If the DCCH frequency plan subset is updated coincidentally with changing the BCN indictor, the DCCH list subset sent on the E-BCCH is updated with a large time interval, for example once every hour. When the DCCH Frequency Plan subset is updated, the BCN indicator is toggled. All mobile stations in the current cell are then required to read and update the BCCH information, including the DCCH list subset.

Figure 4:
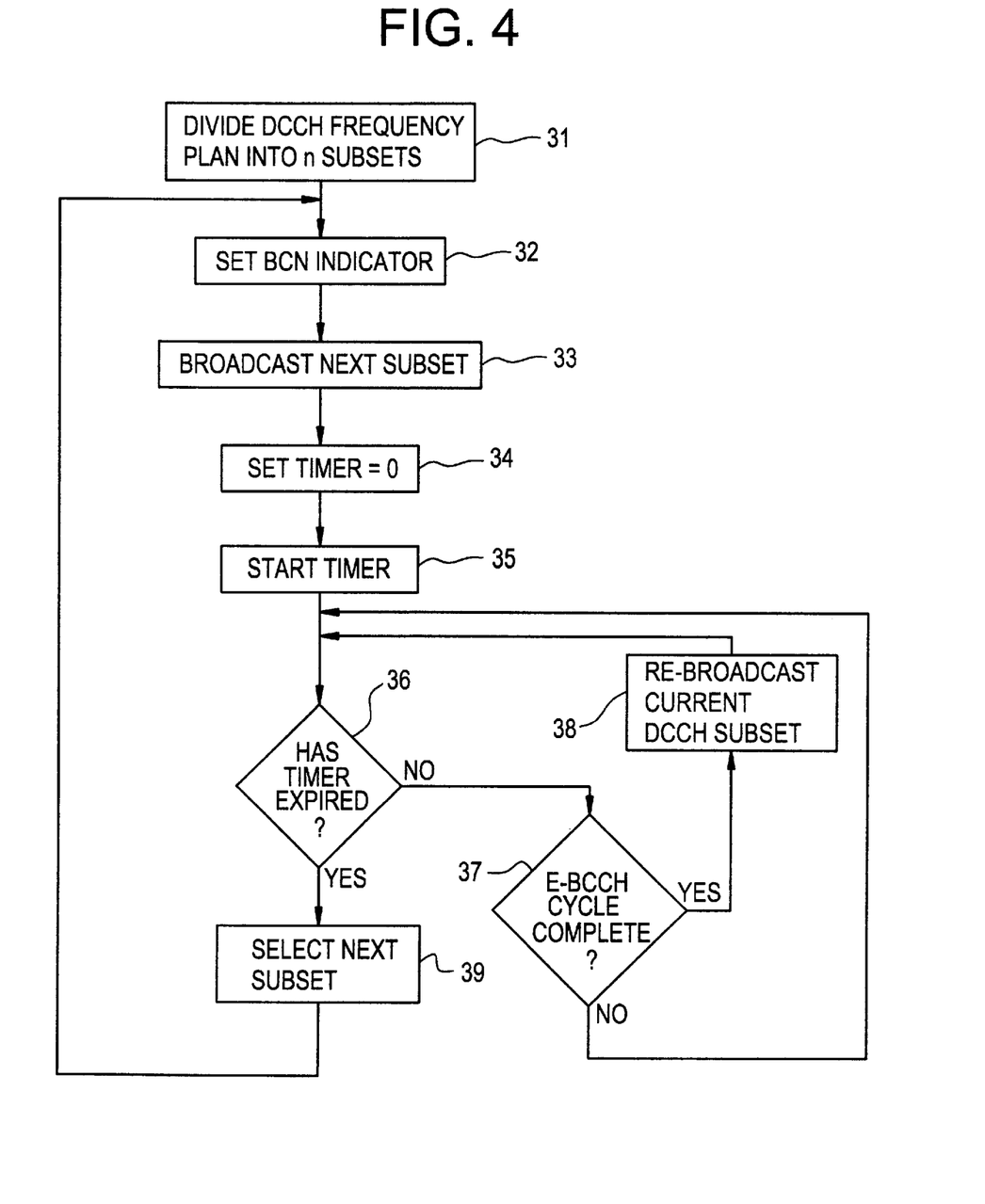
FIG. 4 is a flow chart of the steps involved in the method of the present invention when the cellular network changes the BCCH Change Notification (BCN) indicator coincidentally with updating the DCCH Frequency Plan subset.

FIG. 4 is a flow chart of the steps involved in the method of the present invention when the BCCH Change Notification (BCN) indicator is changed coincidentally with updating the DCCH Frequency Plan subset. At step 31, the DCCH Frequency Plan is divided into a plurality of subsets such that the number of frequencies in each subset is small compared to the overall DCCH Frequency Plan. For example, each DCCH subset may have less than nine frequencies. At step 32, the BCN indicator is set to a new value, and at 33 the first (or next) subset is broadcast, preferably in the E-BCCH. At step 34, a timer is set to zero (0) and then started at step 35. The current subset is broadcast until the timer expires, which may be after a relatively long period of time such as an hour. Thus, at step 36, it is determined whether or not the timer has expired. If not, the cellular network moves to step 37 and waits until the E-BCCH cycle is complete. When the cycle is complete, the network re-broadcasts the current DCCH subset at step 38 and returns to step 36. If the timer has expired at 36, the method moves to step 39 and selects the next DCCH subset. The method then returns to step 32 and repeats the process.

As an example, if the total number of DCCH frequencies in the DCCH frequency plan is 42, and if the size of the DCCH subset used is 7, then a cell broadcasts the complete list of DCCH frequencies in 6 hours. A mobile station operating in a single cell for 6 consecutive hours therefore updates/acquires the complete DCCH frequency plan during that time. However, if the mobile station moves from cell to cell, it acquires the E-BCCH information upon entering a new cell. By broadcasting different DCCH frequency plan subsets in neighbor cells, the mobile station may update/acquire the complete DCCH frequency plan faster.

Some mobile stations are capable of going into a "sleep mode" to conserve battery power. A mobile station in sleep mode wakes up periodically and monitors an assigned position on the mobile station's paging subchannel for a BCN indicator. If a BCN indicator is detected on the mobile station's paging subchannel, the mobile station knows that information broadcast on the F-BCCH or E-BCCH has been modified. The mobile station then reads the broadcast information in subsequent superframes.

If the method is utilized in which the BCN is not changed, the mobile station does not read the broadcast information while in sleep mode. The mobile station reads one cycle of BCCH information before going to sleep.

When updating the frequency plan list in the mobile stations, the present invention provides an efficient method of making small changes. For example, if the network is replacing only one of the DCCH frequencies in its frequency plan, only the frequency plan subset associated with the replaced frequency is updated in the mobile station. Additionally, if a new DCCH frequency is added, the mobile station is notified that a new subset should be added to the list. In the method of the present invention, a DCCH Frequency Plan Specific Subset Sequence Identifier (SSI) is utilized for these purposes. In the DCCH Frequency Plan message, one SSI is associated with multiple DCCH frequencies in the transmitted subset. Upon reading this message, the mobile station updates its list as follows:

1) If the received SSI matches an SSI in the mobile station's DCCH list, and some of the received DCCH frequencies are different from those stored in the mobile station's list, the mobile station replaces the associated stored frequency subset with the new DCCH frequency plan subset received in the DCCH Frequency Plan message. The mobile station also stores the SSI associated with the new subset.

2) If the received SSI does not match an SSI in the mobile station's DCCH list, the mobile station adds the received DCCH subset to its list (both SSI and frequencies).

As long as the mobile station remains in the same cellular system where the DCCH frequency plan is coordinated, the methods described above to update/acquire the complete list of DCCH frequencies in the DCCH frequency plan function to maintain a current DCCH frequency list. However, when the mobile station roams to another system having a different DCCH frequency plan, the entire frequency plan must be updated in the mobile station.

To overcome this problem, the present invention utilizes a DCCH Frequency Plan Identifier (DFPID) and a System Operator Code/System Identification (SOC/SID) Specific DCCH Frequency Plan Indicator (SSDFPI) in the DCCH Frequency Plan message. The SOC/SID identifies each operator with a unique code, and if required, a national or international code as well. The mobile station can then keep track of multiple distinct DCCH frequency plans in different systems.

For example, assuming that a system operator utilizes a first DCCH frequency plan in Seattle, and a different frequency plan in Los Angeles. A mobile station normally home in the Seattle area would be completely updated as to the DCCH frequency plan in Seattle. However, if the subscriber having this mobile station goes to LA, the mobile station needs to know that the list it had in Seattle is no longer valid. If the same SOC and SID are used in both locations, the present invention utilizes a different DFPID. The first time the mobile station tunes to a DCCH upon arriving in LA, the mobile station reads its first DCCH Frequency Plan message, including DFPID and SSDFPI. The mobile station then selects and updates its list as follows:

1) If the received SSDFPI indicates a SOC Specific DCCH Frequency Plan and a SOC match is declared (according to current IS-136 rules) with a SOC associated with a DCCH frequency plan list stored in the mobile station, then:

If the received DFPID is identical to the DFPID associated with the stored list, the mobile station determines whether the received SSI matches a stored SSI. If not, the mobile station adds the received DCCH subset to its DCCH list. If there is a match, the mobile station replaces the stored subset with the received subset.

If none of the stored lists having a SOC match have a DFPID match, the mobile station creates a new DCCH list, or replaces an older list, at the discretion of the mobile station.

2) If the received SSDFPI indicates a SOC Specific DCCH Frequency Plan and no SOC match is declared (according to current IS-136 rules) with a SOC associated with a DCCH frequency plan list stored in the mobile station, then the mobile station creates a new DCCH list, or replaces an older list, at the discretion of the mobile station.

3) If the received SSDFPI indicates a SID Specific DCCH Frequency Plan and the received SID matches with a SID associated with a stored DCCH frequency list, then If the received DFPID is identical to the DFPID associated with the stored list, the mobile station determines whether the received SSI matches a stored SSI. If not, the mobile station adds the received DCCH subset to its DCCH list. If there is a match, the mobile station replaces the stored subset with the received subset.

If none of the stored lists having a SID match have a DFPID match, the mobile station creates a new DCCH list, or replaces an older list, at the discretion of the mobile station.

4) If the received SSDFPI indicates a SID Specific DCCH Frequency Plan and no SID match is declared, then the mobile station creates a new DCCH list, or replaces an older list, at the discretion of the mobile station.

Figure 5:
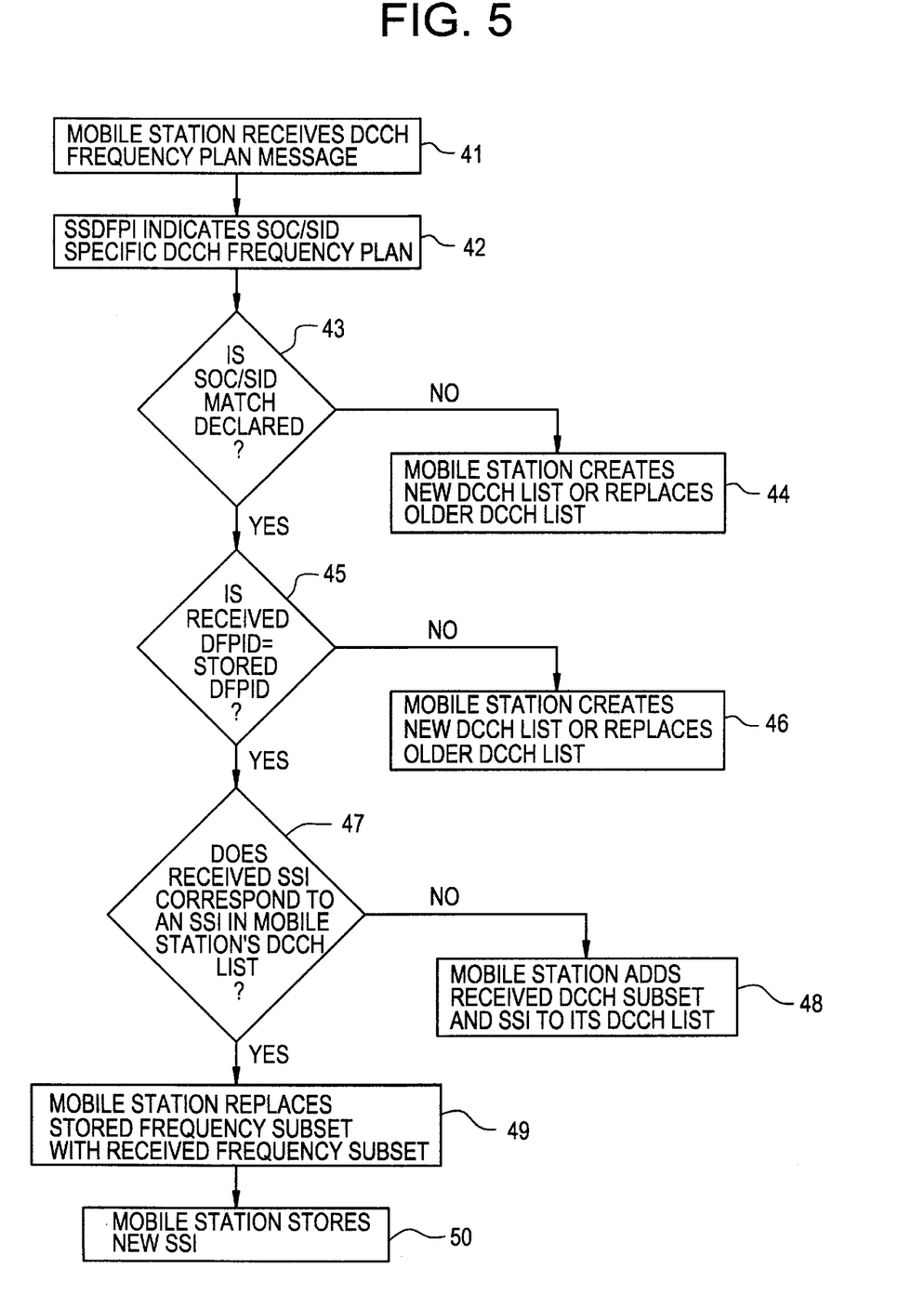
FIG. 5 is a flow chart of the steps involved in the method of the present invention when a mobile station receives a DCCH Frequency Plan message in a cellular network.

FIG. 5 is a flow chart of the steps involved in the method of the present invention when a mobile station receives a DCCH Frequency Plan message in a cellular network in which the mobile station has not yet stored a DCCH list. At step 41, the mobile station receives a new DCCH Frequency Plan message. At 42, the SOC/SID Specific DCCH Frequency Plan Indicator (SSDFPI) is analyzed, and it indicates that a SOC-Specific or a SID-Specific DCCH Frequency Plan is being transmitted by the cellular network. At step 43, it is determined whether or not a match is declared (according to current IS-136 rules) between the stored SOC or SID and the received SOC or SID. If there is not a match, then the mobile station has roamed to a totally new network. Therefore, at step 44, the mobile station creates a new DCCH list, or optionally replaces an older stored DCCH list.

If, however, a SOC or a SID match is declared at step 43, the method moves to step 45 and determines whether or not the received DCCH Frequency Plan Identifier (DFPID) is identical to the stored DFPID. If not, then the mobile station is still within a known cellular network, but has either roamed to an area where a different DCCH Frequency Plan is being utilized, or the DCCH Frequency Plan has been changed since the mobile station was last active. Thus, the method moves to step 46 where the mobile station creates a new DCCH list, or optionally replaces an older stored DCCH list. If, however, the received DFPID is identical to the stored DFPID, the method moves to step 47 where it is determined whether or not the SSI received in the DCCH Frequency Plan message corresponds to an SSI already stored in the mobile station's DCCH list. If not, the method moves to step 48 where the mobile station adds the received DCCH subset and the received SSI to its stored DCCH list. If the received SSI corresponds to an SSI in the mobile station's DCCH list, the method moves to step 49 where the mobile station replaces the stored frequency subset with the received frequency subset. The mobile station may also store the new SSI at 50. The steps of FIG. 5 are repeated each time the mobile station receives a BCN or changes cells.

Table 1 below identifies the information elements included in the DCCH Frequency Plan message, the type of information elements (i.e., mandatory (M) or optional (O)), and the bit length in accordance with the teachings of the present invention.

TABLE 1

| Information Element | Type | Length |
| --- | --- | --- |
| Protocol Discriminator | M | 2 |
| Message Type | M | 6 |
| SOC/SID Specific DCCH Frequency Plan Indicator (SSDFPI) | M | 1 |
| DCCH Frequency Plan Identifier (DFPID) | M | 5 |
| DCCH Frequency List Subset Sequence Identifier (SSI) | M | 6 |
| DCCH Frequency List Subset | M | 14 – 14 + n*11 |

The DCCH Frequency List Subset information element is further defined in Table 2 below.

TABLE 2

| Field | Length |
| --- | --- |
| Number of DCCH Frequencies (n-1) | 3 |
| DCCH Frequency | 11 per instance |

The MS may store multiple DCCH lists so that a first list is not discarded if the MS temporarily travels to another system and then returns.

It is thus believed that the operation and construction of the present invention will be apparent from the foregoing description. While the method, apparatus and system shown and described has been characterized as being preferred, it will be readily apparent that various changes and modifications could be made therein without departing from the spirit and scope of the invention as defined in the following claims.

What is claimed is:

1. A method of providing a list of digital control channel (DCCH) frequencies that are in use in a radio telecommunications network to a mobile station operating in said network, said method comprising the steps of:

dividing the list of DCCH frequencies into a plurality of DCCH subsets;

broadcasting said DCCH subsets to said mobile station;

updating the DCCH frequencies in at least one of said subsets; and broadcasting said updated DCCH subsets to said mobile station.

2. The method of providing a list of digital control channel (DCCH) frequencies to a mobile station of claim 1 wherein said step of dividing the list of DCCH frequencies into a plurality of DCCH subsets includes dividing the list of DCCH frequencies into at least five subsets.

3. A method of providing a list of digital control channel (DCCH) frequencies that are in use in a radio telecommunications network to a mobile station operating in said network, wherein each DCCH in said network includes a superframe having an extended broadcast control channel (E-BCCH) time slot which is broadcast in an E-BCCH cycle, said method comprising the steps of:

dividing the list of DCCH frequencies into a plurality of DCCH subsets; and broadcasting said DCCH subsets to said mobile station, said step of broadcasting said DCCH subsets to said mobile station includes the steps of:

broadcasting a first randomly selected DCCH subset in the E-BCCH time slot of the DCCH; and broadcasting the next sequential DCCH subset when the current E-BCCH cycle is completed.

4. A method of providing a list of digital control channel (DCCH) frequencies that are in use in a radio telecommunications network to a mobile station operating in said network, wherein each DCCH in said network includes a superframe having an extended broadcast control channel (E-BCCH) time slot which is broadcast in an E-BCCH cycle, said method comprising the steps of:

dividing the list of DCCH frequencies into a plurality of DCCH subsets; and broadcasting said DCCH subsets to said mobile station, said step of broadcasting said DCCH subsets to said mobile station includes the steps of:

broadcasting a first randomly selected DCCH subset in the E-BCCH time slot of the DCCH; and broadcasting the next randomly selected DCCH subset when the current E-BCCH cycle is completed.

5. A method of providing a list of digital control channel (DCCH) frequencies that are in use in a radio telecommunications network to a mobile station operating in said network, wherein each DCCH in said network includes a superframe having an extended broadcast control channel (E-BCCH) time slot and a broadcast control channel (BCCH) change notification (BCN) indicator, said method comprising the steps of:

dividing the list of DCCH frequencies into a plurality of DCCH subsets;

broadcasting said DCCH subsets to said mobile station; and changing said BCN indicator whenever any information in said E-BCCH time slot changes.

6. The method of providing a list of digital control channel (DCCH) frequencies to a mobile station of claim 5 wherein said network includes a timer, and said step of broadcasting said DCCH subsets to said mobile station includes the steps of:

broadcasting each of said DCCH subsets for a predetermined time period; and broadcasting the next DCCH subset when the timer expires.

7. A method of providing a list of digital control channel (DCCH) frequencies that are in use in a radio telecommunications network to a mobile station operating in said network, wherein each DCCH includes a superframe having an extended broadcast control channel (E-BCCH) time slot which is broadcast in an E-BCCH cycle, said method comprising the steps of:

dividing the list of DCCH frequencies into a plurality of DCCH subsets;

randomly selecting the DCCH subsets to broadcast in the E-BCCH time slot of the DCCH;

broadcasting the next randomly selected DCCH subset when the current E-BCCH cycle is completed;

updating the DCCH frequencies in at least one of said subsets;

broadcasting a first randomly selected updated DCCH subset in the E-BCCH time slot of the DCCH; and broadcasting the next randomly selected updated DCCH subset when the current E-BCCH cycle is completed.

8. The method of providing a list of digital control channel (DCCH) frequencies that are in use in a radio telecommunications network to a mobile station operating in said network of claim 7 wherein said step of dividing the list of DCCH frequencies into a plurality of DCCH subsets includes dividing the list of DCCH frequencies into at least five DCCH subsets.

9. A method of updating a digital control channel (DCCH) list in a mobile station in a radio telecommunications network having a DCCH Frequency Plan which includes a plurality of DCCH frequencies, and the mobile station stores a list of known DCCH frequencies in DCCH subsets, said method comprising the steps of:

dividing the plurality of DCCH frequencies in the DCCH Frequency Plan into a plurality of DCCH subsets;

broadcasting from said network a DCCH Frequency Plan message, said message including one of said DCCH subsets and an associated DCCH Frequency List Subset Sequence Identifier (SSI);

receiving said message in said mobile station;

determining in said mobile station whether the SSI received in said message corresponds to an SSI stored in the mobile station's DCCH list;

adding the received DCCH subset and the associated SSI to the mobile station's DCCH list, upon determining that the received SSI does not correspond to a stored SSI;

replacing the stored DCCH subset associated with the received SSI with the received DCCH subset, upon determining that the received SSI corresponds to a stored SSI; and storing the received SSI in the mobile station.

10. The method of updating a digital control channel (DCCH) list in a mobile station in a radio telecommunications network of claim 9 further comprising sequentially broadcasting each of said plurality of DCCH subsets and an associated SSI in the DCCH Frequency Plan message.

11. The method of updating a digital control channel (DCCH) list in a mobile station in a radio telecommunications network of claim 9 further comprising randomly broadcasting each of said plurality of DCCH subsets and an associated SSI in the DCCH Frequency Plan message.

12. A method of updating a digital control channel (DCCH) list in a mobile station when the mobile station begins operating in an unknown radio telecommunications network having a DCCH Frequency Plan which includes a plurality of DCCH frequencies, and the mobile station stores a list of known DCCH frequencies, said method comprising the steps of:

dividing the plurality of DCCH frequencies in the DCCH Frequency Plan into a plurality of DCCH subsets;

broadcasting from said network a DCCH Frequency Plan message, said message including one of said DCCH subsets, a System Operator Code/System Identification (SOC/SID) Specific DCCH Frequency Plan Indicator (SSDFPI), a DCCH Frequency List Subset Sequence Identifier (SSI), and a DCCH Frequency Plan Identifier (DFPID);

receiving said message in said mobile station;

determining in said mobile station whether the SOC received in said message matches a stored SOC;

creating a new DCCH list in the mobile station, upon determining that the received SOC does not match the stored SOC;

determining in said mobile station whether the received DFPID is equivalent to a stored DFPID, upon determining that the received SOC corresponds to a stored SOC;

creating a new DCCH list in the mobile station, upon determining that the received DFPID does not match the stored DFPID;

determining in said mobile station whether the received SSI corresponds to an SSI in the mobile station's DCCH list, upon determining that the received DFPID matches the stored DFPID;

adding the received DCCH subset and the associated SSI to the mobile station's DCCH list, upon determining that the received SSI does not correspond to a stored SSI;

replacing the stored DCCH subset associated with the received SSI with the received DCCH subset, upon determining that the received SSI corresponds to a stored SSI; and storing the received SSI in the mobile station.

13. The method of updating a digital control channel (DCCH) list in a mobile station in a radio telecommunications network of claim 12 further comprising sequentially broadcasting each of said plurality of DCCH subsets in the DCCH Frequency Plan message.

14. The method of updating a digital control channel (DCCH) list in a mobile station in a radio telecommunications network of claim 12 further comprising randomly broadcasting each of said plurality of DCCH subsets in the DCCH Frequency Plan message.

15. The method of updating a digital control channel (DCCH) list in a mobile station in a radio telecommunications network of claim 12 wherein said step of creating a new DCCH list in the mobile station, upon determining that the received SOC does not match the stored SOC includes replacing a stored DCCH list with a new DCCH list.

16. The method of updating a digital control channel (DCCH) list in a mobile station in a radio telecommunications network of claim 15 wherein said step of creating a new DCCH list in the mobile station, upon determining that the received DFPID does not match the stored DFPID includes replacing a stored DCCH list with a new DCCH list.

17. A method of updating a digital control channel (DCCH) list in a mobile station when the mobile station begins operating in an unknown radio telecommunications network having a DCCH Frequency Plan which includes a plurality of DCCH frequencies, and the mobile station stores a list of known DCCH frequencies, said method comprising the steps of:

dividing the plurality of DCCH frequencies in the DCCH Frequency Plan into a plurality of DCCH subsets;

broadcasting from said network a DCCH Frequency Plan message, said message including one of said DCCH subsets, a System Operator Code/System Identification (SOC/SID) Specific DCCH Frequency Plan Indicator (SSDFPI), a DCCH Frequency List Subset Sequence Identifier (SSI), and a DCCH Frequency Plan Identifier (DFPID);

receiving said message in said mobile station;

determining in said mobile station whether the SID received in said message matches a stored SID;

creating a new DCCH list in the mobile station, upon determining that the received SID does not match the stored SID;

determining in said mobile station whether the received DFPID is equivalent to a stored DFPID, upon determining that the received SID corresponds to a stored SID;

creating a new DCCH list in the mobile station, upon determining that the received DFPID does not match the stored DFPID;

determining in said mobile station whether the received SSI corresponds to an SSI in the mobile station's DCCH list, upon determining that the received DFPID matches the stored DFPID;

adding the received DCCH subset and the associated SSI to the mobile station's DCCH list, upon determining that the received SSI does not correspond to a stored SSI;

replacing the stored DCCH subset associated with the received SSI with the received DCCH subset, upon determining that the received SSI corresponds to a stored SSI; and storing the received SSI in the mobile station.

18. The method of updating a digital control channel (DCCH) list in a mobile station in a radio telecommunications network of claim 17 further comprising sequentially broadcasting each of said plurality of DCCH subsets in the DCCH Frequency Plan message.

19. The method of updating a digital control channel (DCCH) list in a mobile station in a radio telecommunications network of claim 17 further comprising randomly broadcasting each of said plurality of DCCH subsets in the DCCH Frequency Plan message.

20. The method of updating a digital control channel (DCCH) list in a mobile station in a radio telecommunications network of claim 17 wherein said step of creating a new DCCH list in the mobile station, upon determining that the received SID does not match the stored SID includes replacing a stored DCCH list with a new DCCH list.

21. The method of updating a digital control channel (DCCH) list in a mobile station in a radio telecommunications network of claim 20 wherein said step of creating a new DCCH list in the mobile station, upon determining that the received DFPID does not match the stored DFPID includes replacing a stored DCCH list with a new DCCH list.

* * * * *